United States Patent
Garvey

(10) Patent No.: US 11,277,473 B1
(45) Date of Patent: Mar. 15, 2022

(54) COORDINATING BREAKING CHANGES IN AUTOMATIC DATA EXCHANGE

(71) Applicant: ADP, LLC, Roseland, NJ (US)

(72) Inventor: Stephen Dale Garvey, Alpharetta, GA (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 17/108,261

(22) Filed: Dec. 1, 2020

(51) Int. Cl.
```
H04L 29/08      (2006.01)
H04L 67/1095    (2022.01)
H04L 67/133     (2022.01)
H04L 67/00      (2022.01)
H04L 67/1097    (2022.01)
```

(52) U.S. Cl.
CPC ...... *H04L 67/1095* (2013.01); *H04L 67/1097* (2013.01); *H04L 67/34* (2013.01); *H04L 67/40* (2013.01)

(58) Field of Classification Search
CPC . H04L 67/1095; H04L 67/1097; H04L 67/34; H04L 67/40
See application file for complete search history.

(56) References Cited

U.S. PATENT DOCUMENTS

| | | | | |
|---|---|---|---|---|
| 7,827,562 | B1* | 11/2010 | Hoerle | G06F 9/541 719/313 |
| 8,074,043 | B1* | 12/2011 | Zeis | G06F 16/1748 711/171 |
| 9,026,736 | B1* | 5/2015 | Venkat | G06F 3/0619 711/133 |
| 10,114,637 | B1* | 10/2018 | Willson | G06F 8/71 |
| 10,635,724 | B2* | 4/2020 | McDuff | H04L 43/065 |
| 10,642,667 | B1* | 5/2020 | Babu | G06F 12/02 |
| 2007/0277208 | A1* | 11/2007 | Asbun | H04N 21/26283 725/110 |
| 2008/0151110 | A1* | 6/2008 | Hasegawa | H04H 20/24 348/466 |
| 2008/0304647 | A1* | 12/2008 | Ikemori | H04M 3/38 379/207.02 |
| 2013/0159449 | A1* | 6/2013 | Taylor | G06F 9/544 709/212 |
| 2014/0215307 | A1* | 7/2014 | Schneider | G06F 16/972 715/234 |
| 2015/0212844 | A1* | 7/2015 | Tsirkin | G06F 9/45558 718/1 |
| 2015/0347031 | A1* | 12/2015 | Dallas | G06F 3/061 711/154 |
| 2016/0163172 | A1* | 6/2016 | Hosomi | G08B 21/22 340/522 |
| 2016/0364434 | A1* | 12/2016 | Spitz | G06F 16/215 |

(Continued)

*Primary Examiner* — Shean Tokuta
(74) *Attorney, Agent, or Firm* — Yee & Associates, P.C.

(57) ABSTRACT

A system, method implemented on a computer system, and computer program product for exchanging shared data. A consumer of shared data receives new shared data and determines whether the new shared data comprises a breaking change. In response to a determination that the new shared data does not comprise a breaking change, the new shared data is saved and set as the current shared data. In response to a determination that the new shared data does comprise a breaking change, the new shared data is saved but is not set as the current shared data. New shared data that was saved but not set as current shared data may be set as current shared data during deployment of new program code for the consumer.

26 Claims, 8 Drawing Sheets

(56) References Cited

U.S. PATENT DOCUMENTS

2018/0288170 A1* 10/2018 Yin ........................ H04L 67/12
2021/0042285 A1*  2/2021 Beyer ................. G06F 16/2329
2021/0327001 A1* 10/2021 Bater ..................... G06Q 40/00

* cited by examiner

COORDINATING BREAKING CHANGES IN AUTOMATIC DATA EXCHANGE

BACKGROUND INFORMATION

1. Field

The present disclosure relates generally to systems and methods for processing data by operating computer programs. More particularly, illustrative embodiments are related to systems, methods implemented in computer systems, and computer program products for exchanging shared data used by computer programs and updating computer programs that use shared data.

2. Background

An application is a computer program that is designed to run on a data processing system to perform a group of coordinated functions, tasks, or activities for the benefit of a user. An application also may be referred to as an app, an application program, or a software application.

Middleware is computer software that provides services to software applications beyond those available from a computer operating system. For example, without limitation, middleware may include software that enables communication and management of data in distributed applications.

An organization, such as a business entity or another appropriate organization, may use a variety of different computer software programs, including applications and middleware, to perform a variety of different actions. For example, without limitation, a business organization may use a variety of different applications to perform a variety of different actions related to human capital management or other appropriate business functions. Human capital management also may be referred to as human resource management.

It is very common for applications and other software systems to exchange data. For example, without limitation, in a microservices environment, functionality may be implemented in many relatively small applications that exchange shared data to provide services. Systems that generate shared data that is exchanged with other systems may be referred to as producers. Systems that use the shared data that is exchanged to provide services may be referred to as consumers. Messaging middleware may be used to automatically exchange data between systems and keep the data synchronized in microservices environments and other environments where shared data is exchanged between various applications.

The format or content of data that is exchanged between various systems in a microservices or other environment may change in such a way that a consumer application cannot use the data. For example, shared data may change in such a way that a consumer application that uses the data may not operate properly or may even stop operating entirely. Such a change in the format, content, or other characteristic of shared data that causes an undesirable effect in a consumer of the data may be referred to as a breaking change.

Accordingly, it would be beneficial to have a method and apparatus that take into account one or more of the issues discussed above as well as possibly other issues. In particular, it would be beneficial to have a method and apparatus that effectively handles the exchange of breaking data between systems in a microservices or other data exchange environment.

SUMMARY

An embodiment of the present disclosure provides a method for exchanging shared data. New shared data is received by a computer system. The computer system determines whether the new shared data comprises a breaking change. In response to a determination that the new shared data does not comprise a breaking change, the computer system saves the new shared data and sets the new shared data as current shared data. In response to a determination that the new shared data does comprise a breaking change, the computer system saves the new shared data but does not set the new shared data as current shared data.

Another embodiment of the present disclosure provides an apparatus for exchanging shared data. The apparatus includes a database and a consumer change event processor. The consumer change event processor is configured to: receive new shared data, determine whether the new shared data comprises a breaking change, in response to a determination that the new shared data does not comprise a breaking change, save the new shared data in the database and set the new shared data as current shared data, and, in response to a determination that the new shared data does comprise a breaking change, save the new shared data in the database and not set the new shared data as current shared data.

Another embodiment of the present disclosure provides a computer program product for exchanging shared data. The computer program product comprises a computer readable storage medium having program instructions embodied therewith. The program instructions are executable by a device to cause the device to: receive new shared data, determine whether the new shared data comprises a breaking change, in response to a determination that the new shared data does not comprise a breaking change, save the new shared data and set the new shared data as current shared data, and, in response to a determination that the new shared data does comprise a breaking change, save the new shared data and do not set the new shared data as current shared data.

Another embodiment of the present disclosure provides a method for deploying new program code for a consumer of shared data. A computer system determines whether new shared data that is not set as current shared data is available. In response to a determination that the new shared data that is not set as current shared data is available, the computer system deploys the new program code and sets the new shared data as the current shared. In response to a determination that the new shared data that is not set as current data is not available, the computer system stops deployment of the new program code and provides an error indication.

Another embodiment of the present disclosure provides an apparatus for deploying new program code for a consumer of shared data. The apparatus includes a database, a set current data version processor, and a deployment processor. The set current data version processor is configured to: determine whether new shared data that is not set as current shared data is available in the database, provide a success indication in response to a determination that the new shared data that is not set as current shared data is available in the database, provide a failure indication in response to a determination that the new shared data that is not set as current data is not available in the database, and set the new shared data as the current shared data. The deployment processor is configured to: call the set current data version processor to determine whether new shared data that is not set as current shared data is available in the database, deploy the new program code in response to a success indication from the set current data version processor, and stop deployment of the new program code and provide an error indication in response to a failure indication from the set current data version processor.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
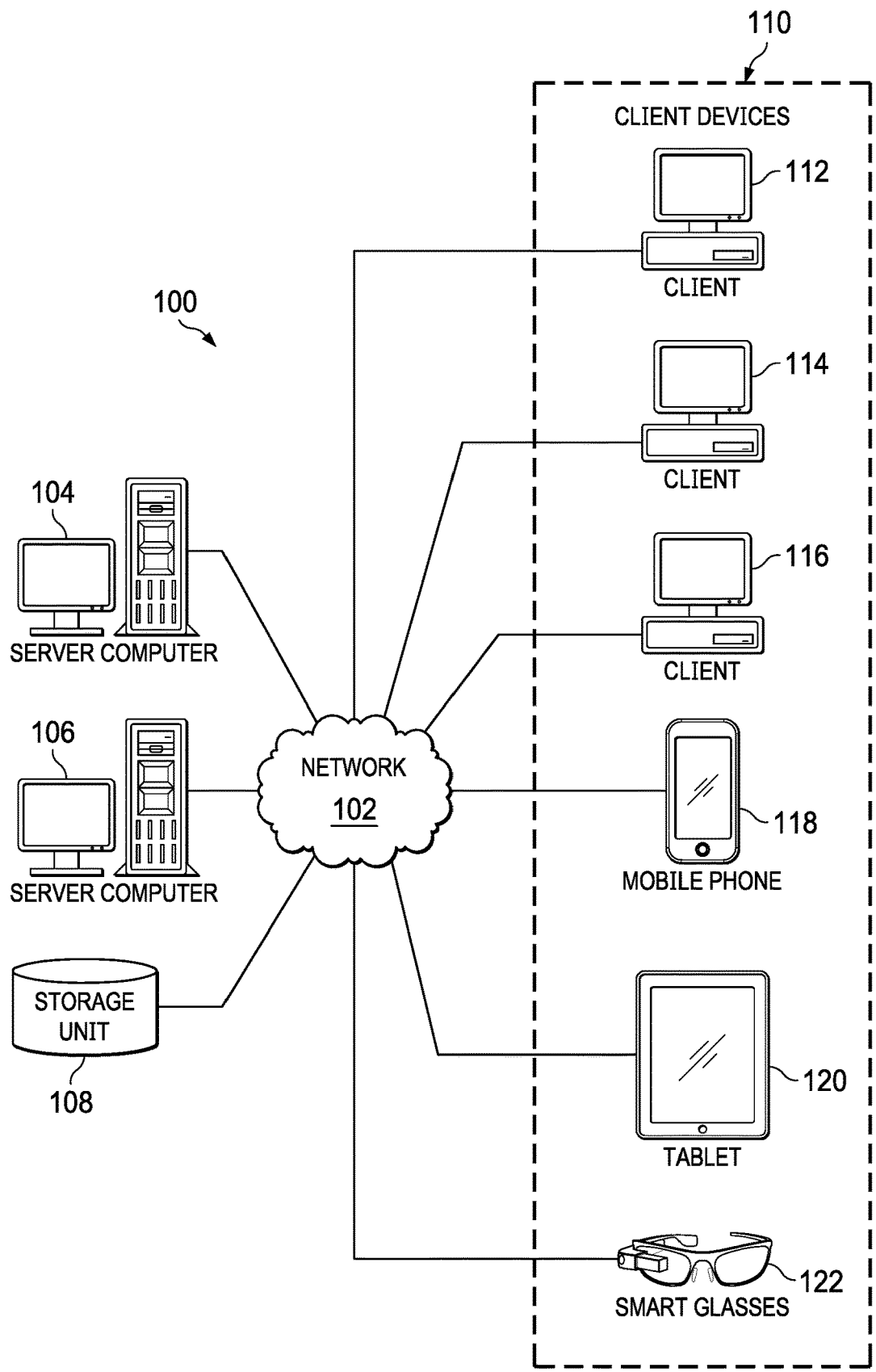
FIG. 1 is a pictorial representation of a network of data processing systems in which illustrative embodiments may be implemented.

The illustrative embodiments recognize and take into account one or more different considerations. For example, the illustrative embodiments recognize and take into account that shared data with a breaking change that is received by a consumer application in a microservices or other data exchange environment may not be able to be processed by the consumer application or may cause the consumer application to operate improperly or even to fail. New program code may be deployed to update a consumer application to process the changed data without breaking. However, the deployment of new program code for a consumer application must be coordinated with the change in the shared data such that the application is updated before shared data with a breaking change is received by the application.

One way to coordinate the deployment of new program code to update consumer applications with changes in shared data is to synchronize the deployment of new program code for consumer applications with the deployment of the new program code for producers that causes the changes in the shared data. However, synchronizing new program code deployments for producers and consumers across a data exchange environment may not be desirable or even possible. For example, producer and consumer systems that exchange shared data may be controlled by different organizations and may require different deployment schedules due to other concerns or priorities.

Another way to avoid the undesirable effects of breaking changes in shared data is for consumer applications to include program code to support processing various different versions of shared data, including versions of shared data with changes that would otherwise be breaking changes and prior versions of the data. However, the use of such conditional programming code may be undesirable because it adds to the complexity and maintenance of consumer applications.

Illustrative embodiments provide for coordinating breaking changes in shared data with the deployment of new program code for consumer applications without requiring synchronization of new program code deployments for data producers and consumers. In accordance with an illustrative embodiment, program code for a producer that generates shared data with breaking changes may be deployed before new program code is deployed to update consumer applications to handle the changed data.

In accordance with an illustrative embodiment, breaking changes are automatically identified in shared data received by a consumer application. The shared data with breaking changes is saved by the consumer application such that program code for the producer that causes the change in the shared data may be deployed in advance of the deployment of new program code for the consumer application to handle the changed data. Moreover, in accordance with an illustrative embodiment, the consumer program code does not need to support multiple major versions of exchanged data.

Illustrative embodiments provide a process for the deployment of new program code for consumer applications that includes a dry run to make sure that shared data with expected breaking changes is available before deploying the updated program code. Updating the program code for consumer applications before the deployment of program code for producers that would make updating the consumer applications necessary is, therefore, avoided. The deployment of new program code for consumer applications in accordance with an illustrative embodiment does not require an exact match of the version of the program code with the version of received shared data with a breaking change. Therefore, shared data with more recent non-breaking changes is not missed.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

As used herein, "a number of" when used with reference to items, means one or more items. For example, "a number of different types of networks" is one or more different types of networks.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. As depicted, client devices 110 include client computer 112, client computer 114, and client computer 116. Client devices 110 can be, for example, computers, workstations, or network computers. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

Network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
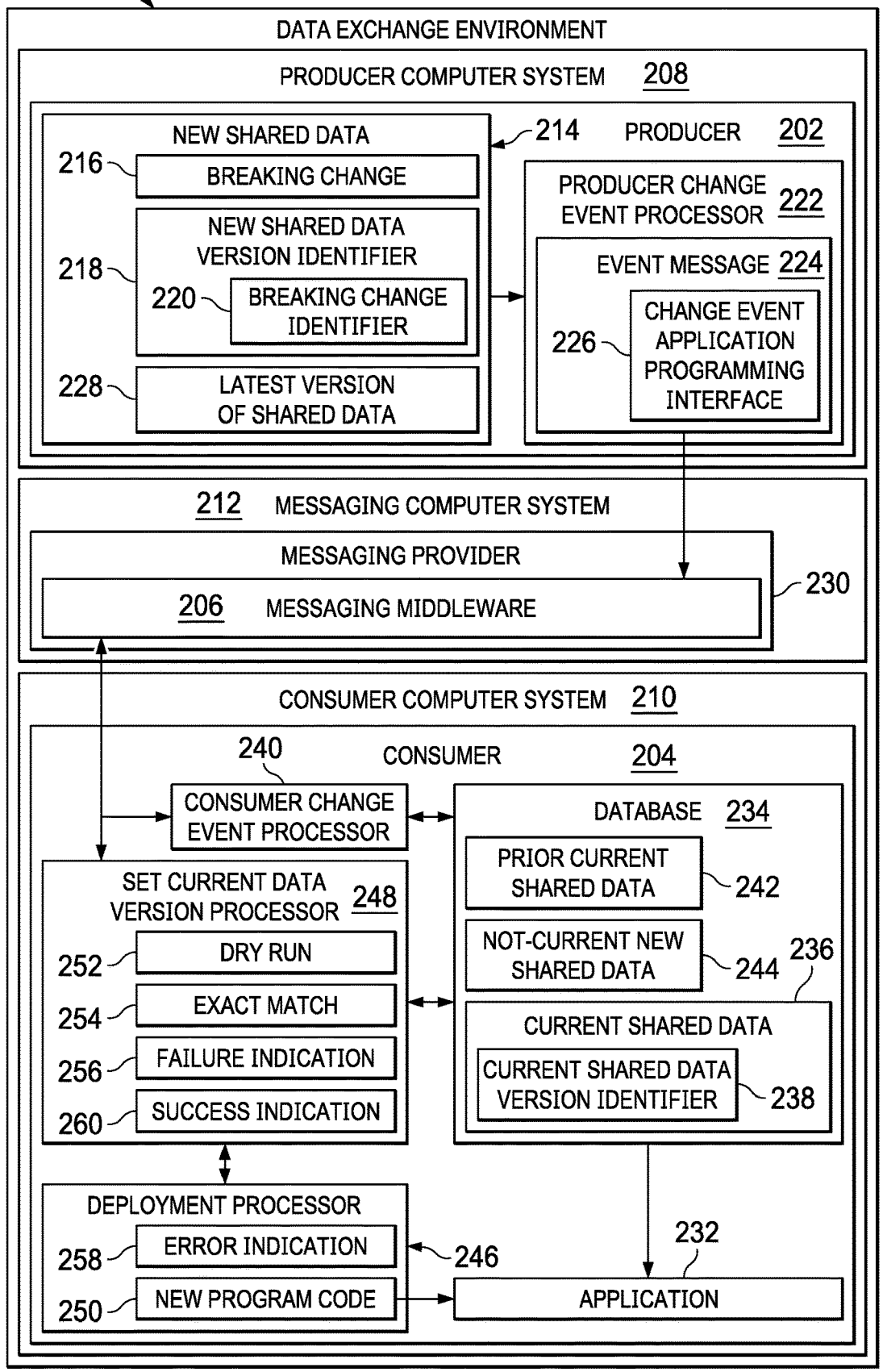
FIG. 2 is an illustration of a block diagram of a data exchange environment in accordance with an illustrative embodiment.

Turning to FIG. 2, an illustration of a block diagram of a data exchange environment is depicted in accordance with an illustrative embodiment. Data exchange environment 200 may include any environment in which data is exchanged between producers of the data and consumers that use the data to perform any appropriate functions. For example, without limitation, data exchange environment 200 may be a microservices environment. Data exchange environment 200 may be implemented in a computer system, such as network data processing system 100 in FIG. 1.

Data exchange environment 200 includes producer 202 and consumer 204. Illustrative embodiments may be implemented in a data exchange environment that includes any appropriate number of producers and consumers. Producer 202 generates shared data. Illustrative embodiments may be implemented in a data exchange environment that includes more than one producer. Consumer 204 uses the shared data generated by producer 202 to perform a function. Illustrative embodiments may be implemented in a data exchange environment that includes more than one consumer. Shared data that is generated by producer 202 may be provided to consumer 204 via messaging middleware 206.

Producer 202 may be implemented using producer computer system 208. Consumer 204 may be implemented using consumer computer system 210. Messaging middleware 206 may be implemented using messaging computer system 212. In this illustrative example, producer computer system 208, consumer computer system 210, and messaging computer system 212 are physical hardware systems and include one or more data processing systems. When more than one data processing system is present in producer computer system 208, consumer computer system 210, and messaging computer system 212, those data processing systems are in communication with each other using a communications medium. The communications medium can be a network. The data processing systems can be selected from at least one of a computer, a server computer, a tablet computer, or some other suitable data processing system.

Producer 202 generates new shared data 214. New shared data 214 may include breaking change 216. Breaking change 216 includes any change that may cause consumer 204 to be unable to use new shared data 214 in a normal or appropriate manner.

Producer 202 generates new shared data version identifier 218 for new shared data 214. New shared data version identifier 218 is associated with new shared data 214 and identifies a version of new shared data 214. In accordance with an illustrative embodiment, new shared data version identifier 218 indicates whether new shared data 214 included breaking change 216. New shared data version identifier 218 thus provides breaking change identifier 220 to identify new shared data 214 that includes breaking change 216.

New shared data version identifier 218 may be implemented in any appropriate manner. For example, without limitation new shared data version identifier 218 may include a major number and a minor number. The major number of new shared data version identifier 218 for new shared data 214 may be incremented only when new shared data 214 includes breaking change 216. The minor number of new shared data version identifier 218 for new shared data 214 may be incremented when new shared data 214 includes a change other than breaking change 216.

Producer 202 includes producer change event processor 222. Producer change event processor 222 is configured to generate event message 224 in response to the generation of new shared data 214 by producer 202. Producer change event processor 222 publishes event message 224 to messaging middleware 206 to notify consumer 204 that new shared data 214 is available.

Event message 224 may include new shared data 214 along with new shared data version identifier 218. Alternatively, or in addition, event message 224 may include change event application programming interface 226 that allows consumer 204 to access new shared data 214 along with new shared data version identifier 218 when event message 224 is processed by consumer 204.

New shared data 214 is typically latest version of shared data 228 produced by producer 202. However, after sending event message 224 to consumer 204 for new shared data 214, producer 202 may generate a newer version of new shared data 214. In this case, new shared data 214 that consumer 204 is aware of may not be the same as latest version of shared data 228 produced by producer 202.

Messaging middleware 206 may be implemented in any appropriate manner to provide event message 224 and new shared data 214 from producer 202 to consumer 204. For example, without limitation, messaging middleware 206 may be provided by messaging provider 230.

Consumer 204 may be configured to use shared data in any appropriate manner. For example, consumer 204 may include any appropriate application 232 that is configured to use shared data to perform any appropriate function.

Shared data that is used by application 232 may be stored in database 234. Database 234 may be implemented in any appropriate manner to store shared data for use by application 232. Shared data that is stored in database 234 and that is currently being used by application 232 is identified as current shared data 236. Current shared data version identifier 238 is associated with current shared data 236 and identifies the version of current shared data 236.

Consumer change event processor 240 is configured to process event message 224 received from producer 202 via messaging middleware 206. In response to receiving event message 224, consumer change event processor 240 gets new shared data version identifier 218 for new shared data 214 identified by event message 224. New shared data version identifier 218 for new shared data 214 is compared to current shared data version identifier 238 for current shared data 236 to determine whether new shared data includes breaking change 216. If consumer 204 does not have any current shared data 236, new shared data 214 is considered not to include breaking change 216.

In response to a determination that new shared data 214 does not include breaking change 216, consumer change event processor 240 saves new shared data 214 and new shared data version identifier 218 as current shared data 236 and current shared data version identifier 238. In this case, current shared data 236 that was replaced by new shared data 214 may be saved in database 234 as prior current shared data 242 for rollback, if necessary. In response to a determination that new shared data 214 includes breaking change 216, consumer change event processor 240 saves new shared data 214 and new shared data version identifier 218 in database 234 as not-current new shared data 244.

In accordance with an illustrative embodiment, deployment processor 246 and set current data version processor 248 are used when new program code 250 is deployed to update application 232. Deployment processor 246 first calls set current data version processor 248 to set new shared data 214 as current shared data 236 with DRY RUN parameter 252 set as true and EXACT MATCH parameter 254 set as false. Set current data version processor 248 will return failure indication 256 if new shared data 214 is not available. In this case, deployment processor 246 will stop the deployment of new program code 250 and provide error indication 258. Otherwise, set current data version processor 248 will provide success indication 260, and new program code 250 that supports new shared data 214 with breaking change 216 is deployed.

Deployment processor 246 then calls set current data version processor 248 again set new shared data 214 as current shared data 236, but this time passes DRY RUN parameter 252 as false and EXACT MATCH parameter 254 as false. Setting EXACT MATCH parameter 254 to false addresses the situation where additional non-breaking changes have been made to shared data so that consumer 204 gets latest version of shared data 228 when it is deployed and does not miss a version.

The illustration of the different components in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
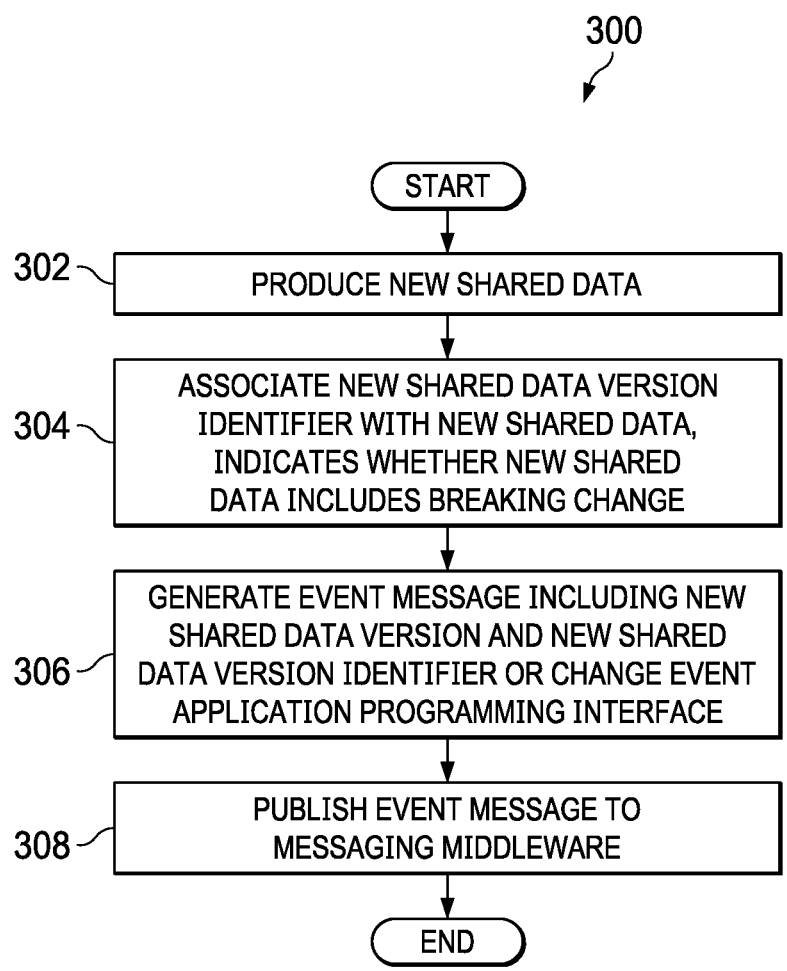
FIG. 3 is an illustration of a flowchart of a process for processing a change event by a producer of new shared data in accordance with an illustrative embodiment.

Turning to FIG. 3, an illustration of a flowchart of a process for processing a change event by a producer of new shared data is depicted in accordance with an illustrative embodiment. Process 300 may be implemented, for example, in producer 202 in data exchange environment 200 in FIG. 2.

Process 300 begins with producing new shared data (operation 302). A new shared data version identifier that indicates whether the new shared data includes a breaking change is associated with the new shared data (operation 304). An event message is then generated that includes the new shared data and new shared data version identifier or a change event application programming interface (operation 306). The event message is published to messaging middleware (operation 308), to send the event message to a consumer, with the process terminating thereafter.

Figure 4:
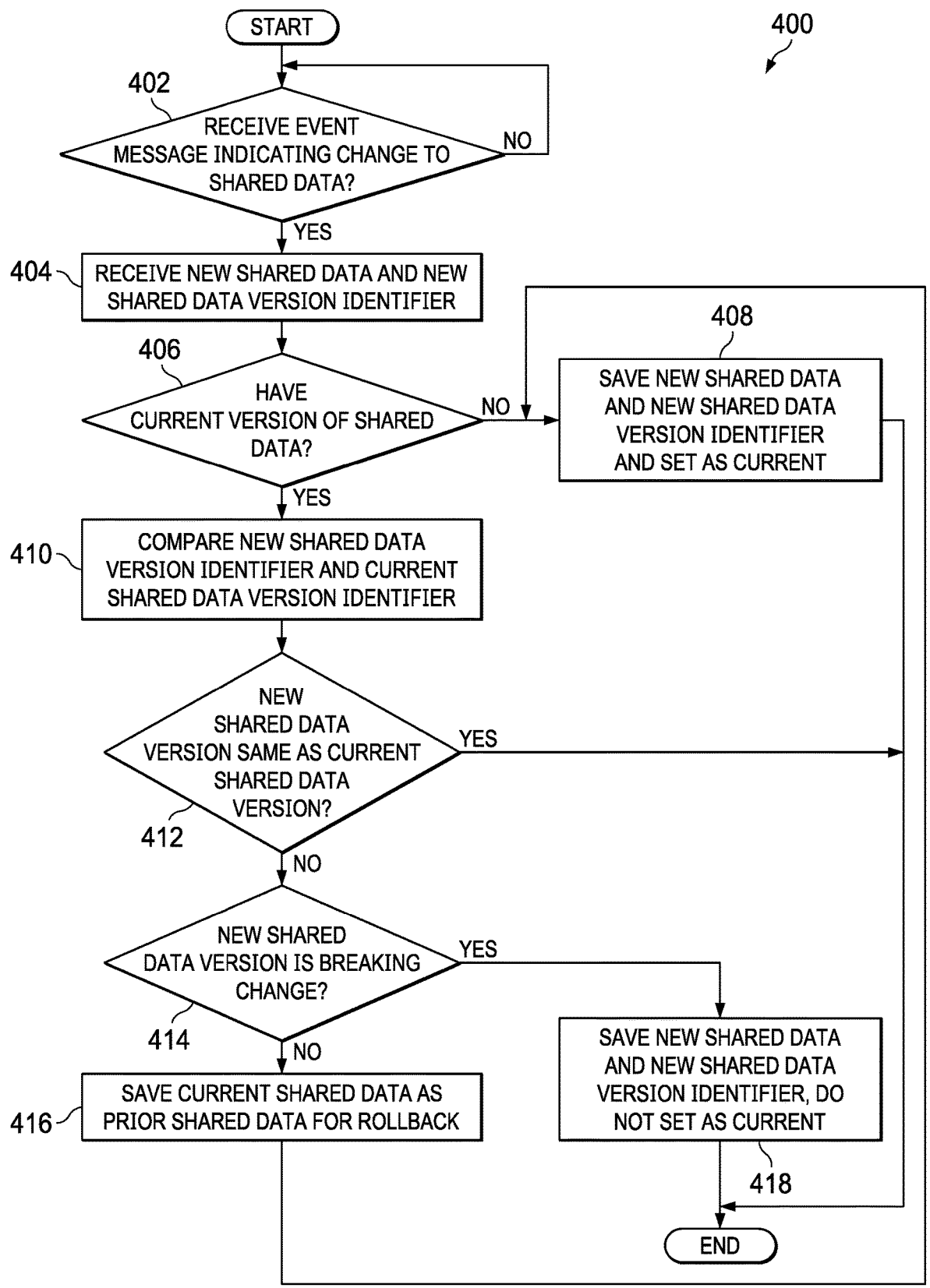
FIG. 4 is an illustration of a flowchart of a process for processing a change event by a consumer of shared data in accordance with an illustrative embodiment.

Turning to FIG. 4, an illustration of a flowchart of a process for processing a change event by a consumer of shared data is depicted in accordance with an illustrative embodiment. Process 400 may be implemented, for example, in consumer change event processor 240 in FIG. 2.

Process 400 begins with determining whether an event message indicating a change to shared data has been received (operation 402). In response to a determination that an event message has been received, new shared data and a new shared data version identifier are received (operation 404). It is then determined whether there is a current version of shared data (operation 406). In response to a determination that there is not a current version of shared data, the new shared data and new shared data version identifier are saved and set as current (operation 408), with the process terminating thereafter.

In response to a determination at operation 406 that there is a current version of shared data, the new shared data version identifier is compared to a current shared data version identifier (operation 410). In response to a determination that the new shared data version is the same as the current shared data version (operation 412), the process terminates. In response to a determination that the new shared data version is a breaking change (operation 414), the current shared data is saved as prior shared data for a possible rollback (operation 416) and the new shared data and new shared data version identifier are saved and set as current (operation 408), with the process terminating thereafter. In response to a determination at operation 414 that the new shared data includes a breaking change, the new shared data and new shared data version identifier are saved but not set as current (operation 418), with the process terminating thereafter.

Figure 5:
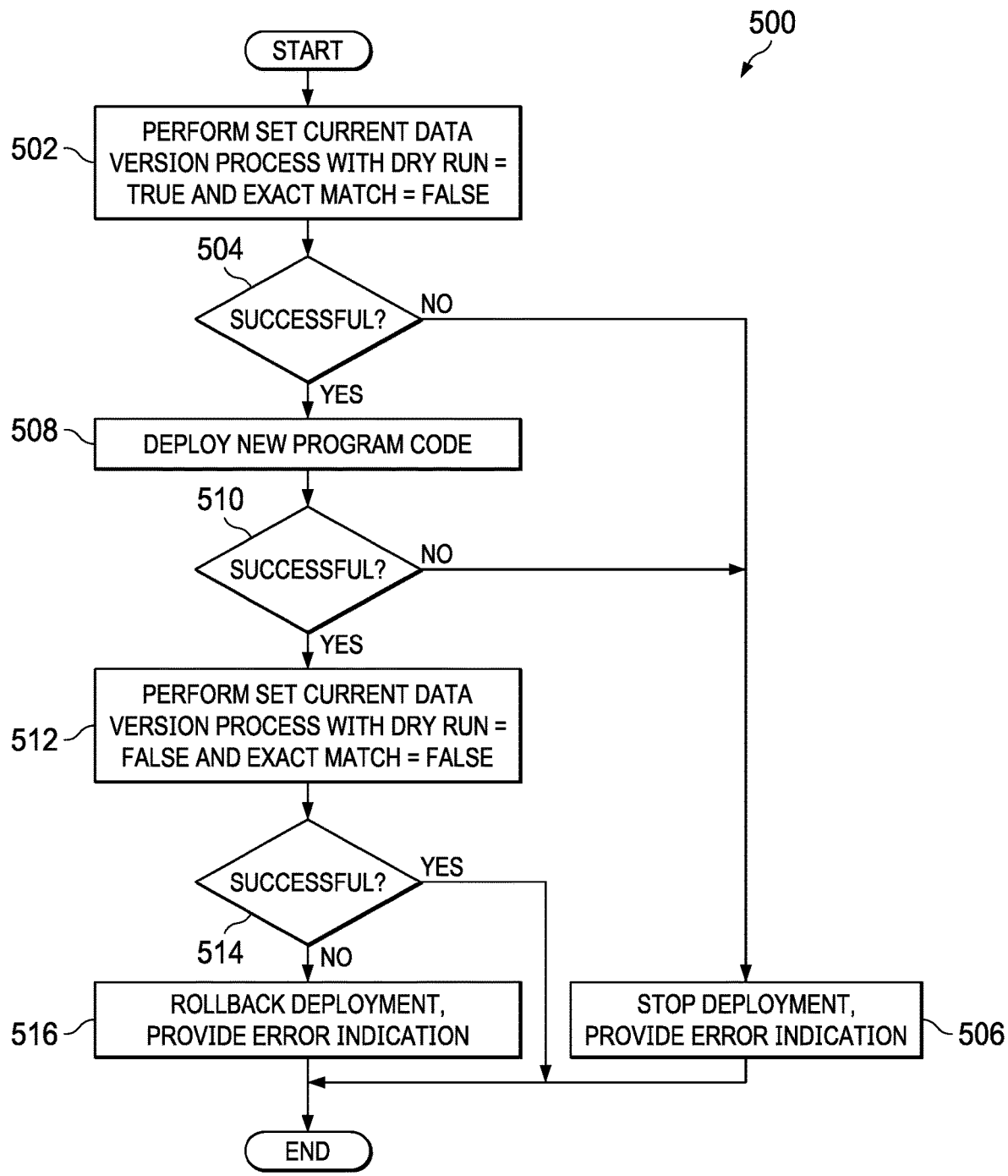
FIG. 5 is an illustration of a flowchart of a process for deploying new program code for a consumer of shared data in accordance with an illustrative embodiment.

Turning to FIG. 5, an illustration of a flowchart of a process for deploying new program code for a consumer of shared data is depicted in accordance with an illustrative embodiment. Process 500 may be implemented, for example, in deployment processor 246 in FIG. 2.

Process 500 begins with performing a set current data version process with parameters DRY RUN set true and EXACT MATCH set false (operation 502). If operation 502 is not successful (operation 504), the deployment is stopped and an error indication is provided (operation 506), with the process terminating thereafter.

If operation 502 is successful, the new program code is deployed (operation 508). If the deployment is not successful, the deployment is stopped and an error indication is provided (operation 506), with the process terminating thereafter.

If the deployment operation 508 is successful, the set current data version process is performed with parameters DRY RUN set false and EXACT MATCH set false (operation 512). If operation 512 is successful (operation 514), the process terminates. If operation 512 is not successful, the deployment is rolled back and an error indication is provided (operation 516), with the process terminating thereafter.

Figure 6A:
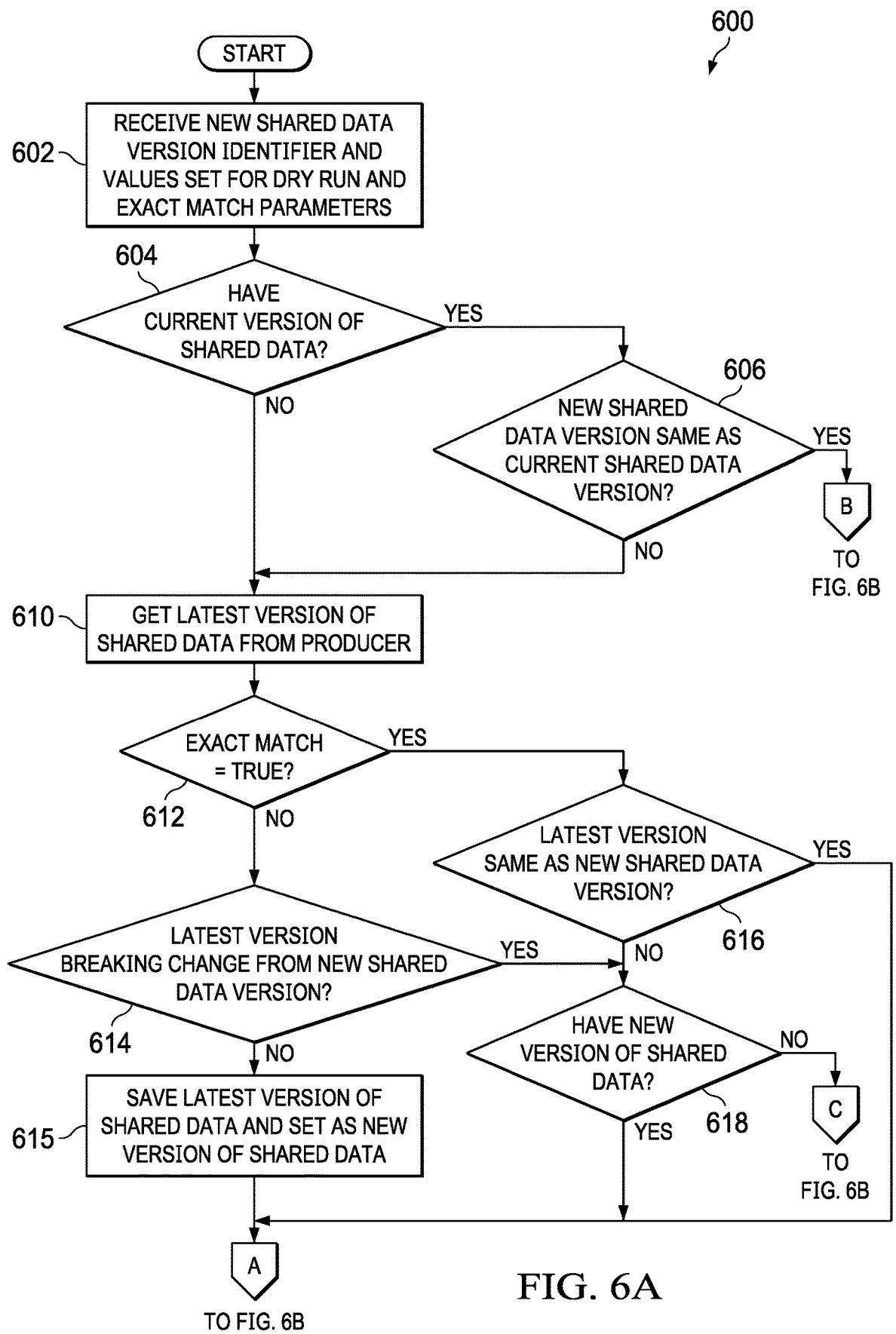
FIG. 6 is an illustration of a flowchart of a process for setting a current version of shared data by a consumer of shared data in accordance with an illustrative embodiment.
Figure 6B:
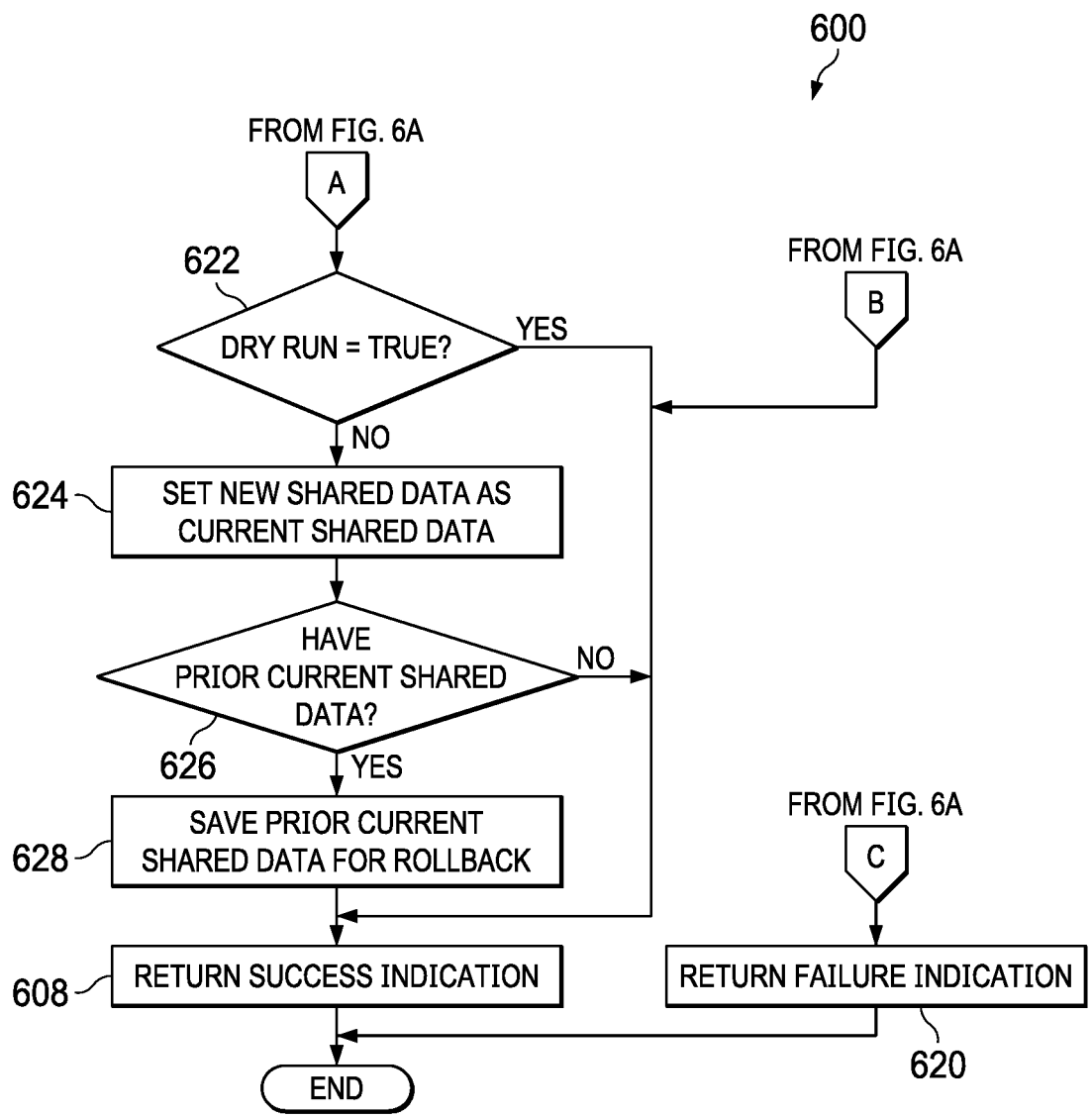

Turning to FIG. 6, an illustration of a flowchart of a process for setting a current version of shared data by a consumer of shared data is depicted in accordance with an illustrative embodiment. Process 600 may be implemented, for example, in set current data version processor 248 in FIG. 2. Process 600 may be used to perform operations 502 and 512 in process 500 in FIG. 5.

Process 600 begins with receiving a new shared data version identifier and set values for parameters DRY RUN and EXACT MATCH (operation 602). It is then determined if there is a current version of shared data (operation 604). In response to a determination that there is a current version of shared data, it is determined whether the new shared data version is the same as the current shared data version (operation 606). In response to a determination that the new shared data version is the same as the current shared data version a success indication is returned (operation 608), with the process terminating thereafter.

In response to a determination at operation 604 that there is not a current version of shared data or a determination at operation 606 that the new shared data version is not the same as the current shared data version, the latest version of shared data is obtained from the producer of the shared data (operation 610). If the EXACT MATCH parameter is set to false, it is determined whether the latest version of shared data includes a breaking change from the new shared data version (operation 614). In response to a determination that the latest version of shared data does not include a breaking change, the latest version of shared data is saved and set as the new version of shared data (operation 615).

It is then determined whether the DRY RUN parameter is set to true (operation 622). If DRY RUN parameter is set to true, a success indication is returned (operation 608), with the process terminating thereafter. If DRY RUN parameter is set to false, the new shared data is set as the current shared data (operation 624). It is then determined whether there is any prior current shared data (operation 626). If there is no prior current shared data, a success indication is returned (operation 608), with the process terminating thereafter. If there is prior current shared data, the prior current shared data is saved for a possible rollback (operation 628). A success indication is the returned (operation 608), with the process terminating thereafter.

Returning to operation 614, if it determined that the latest version of the shared data includes a breaking change, it is determined whether there is a new version of shared data (operation 618). In response to a determination that there is not a new version of shared data, a failure indication is returned (operation 620), with the process terminating thereafter.

Returning to operation 612, in response to a determination that the parameter EXACT MATCH is set true, it is determined whether the latest version of the shared data is the same as the new version of the shared data (operation 616). In response to a determination that the latest version is not the same as the new version the process continues with operation 618. Otherwise, the process continues with operation 622.

Figure 7:
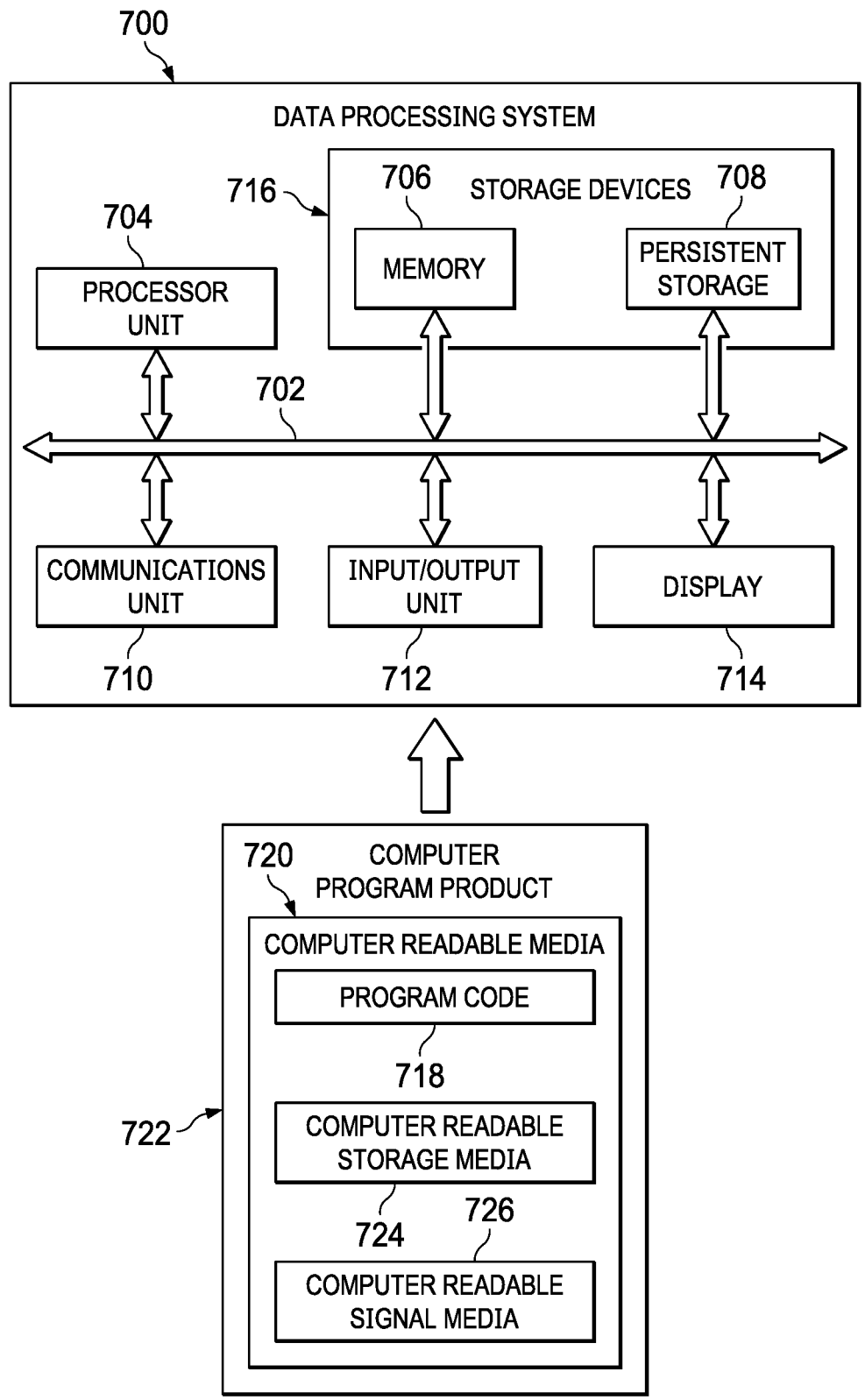
FIG. 7 is an illustration of a block diagram of a data processing system in accordance with an illustrative embodiment.

Turning to FIG. 7, an illustration of a block diagram of a data processing system is depicted in accordance with an illustrative embodiment. Data processing system 700 may be used to implement one or more of server computer 104 in FIG. 1, server computer 106 in FIG. 1, client devices 110 in FIG. 1, producer computer system 208 in FIG. 2, consumer computer system 210 in FIG. 2, and messaging computer system 212 in FIG. 2. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general-purpose central processing units (CPUs). In an alternate embodiment, processor unit 704 comprises one or more graphical processing units (CPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Alternatively, program code 2218 may be transferred to data processing system 700 using computer-readable signal media 726.

Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media" can be singular or plural. For example, program code 718 can be located in computer-readable media 720 in the form of a single storage device or system. In another example, program code 718 can be located in computer-readable media 720 that is distributed in multiple data processing systems. In other words, some instructions in program code 718 can be located in one data processing system while other instructions in program code 718 can be located in another data processing system. For example, a portion of program code 718 can be located in computer-readable media 720 in a server computer while another portion of program code 718 can be located in computer-readable media 720 located in a set of client computers.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for exchanging shared data, comprising:
receiving, by a computer system, new shared data;
determining, by the computer system, whether the new shared data comprises a breaking change, wherein the breaking change comprises a change in format or content of the new shared data such that a consumer application that uses the new shared data cannot operate properly;
in response to a determination that the new shared data does not comprise a breaking change, saving the new shared data and setting the new shared data as current shared data by the computer system; and
in response to a determination that the new shared data does comprise a breaking change, saving the new shared data and not setting the new shared data as current shared data by the computer system.

2. The method of claim 1, wherein receiving the new shared data comprises receiving the new shared data from a producer of the new shared data via messaging middleware.

3. The method of claim 2, wherein the computer system is a consumer computer system, and further comprising:
producing the new shared data by a producer computer system;
assigning a new shared data version identifier to the new shared data by the producer computer system, wherein the new shared data version identifier indicates whether the new shared data comprises a breaking change;
generating, by the producer computer system, an event message indicating a change to shared data; and
publishing the event message to the messaging middleware.

4. The method of claim 1, wherein receiving the new shared data comprises:
receiving, by the computer system, an event message including the new shared data.

5. The method of claim 1, wherein receiving the new shared data comprises:
receiving, by the computer system, an event message indicating a change to shared data; and
in response to receiving the event message, retrieving the new shared data by the computer system.

6. The method of claim 1, wherein determining whether the new shared data comprises a breaking change comprises comparing a new shared data version identifier for the new shared data with a current shared data version identifier for the current shared data.

7. The method of claim 1 further comprising:
in response to receiving the new shared data, determining, by the computer system, whether there is a current version of the shared data; and
in response to a determination that there is not a current version of the shared data, determining, by the computer system that the new shared data does not comprise a breaking change.

8. An apparatus for exchanging shared data, comprising:
a database; and
a consumer change event processor configured to:
receive new shared data;
determine whether the new shared data comprises a breaking change, wherein the breaking change comprises a change in format or content of the new shared data such that a consumer application that uses the new shared data cannot operate properly;
in response to a determination that the new shared data does not comprise a breaking change, save the new shared data in the database and set the new shared data as current shared data; and
in response to a determination that the new shared data does comprise a breaking change, save the new shared data in the database and not set the new shared data as current shared data.

9. The apparatus of claim 8, wherein the consumer change event processor is configured to receive the new shared data from a producer of the new shared data via messaging middleware.

10. The apparatus of claim 9 further comprising a producer configured to:
produce the new shared data;
assign a new shared data version identifier to the new shared data, wherein the new shared data version identifier indicates whether the new shared data comprises a breaking change;
generate an event message indicating a change to shared data; and
publish the event message to the messaging middleware.

11. The apparatus of claim 8, wherein the consumer change event processor is configured to receive an event message including the new shared data.

12. The apparatus of claim 8, wherein the consumer change event processor is configured to:
receive an event message indicating a change to shared data; and
retrieve the new shared data in response to receiving the event message.

13. The apparatus of claim 8, wherein the consumer change event processor is configured to determine whether the new shared data comprises a breaking change by comparing a new shared data version identifier for the new shared data with a current shared data version identifier for the current shared data.

14. The apparatus of claim 8, wherein the consumer change event processor is further configured to:
in response to receiving the new shared data, determine whether there is a current version of the shared data; and
in response to a determination that there is not a current version of the shared data, determine that the new shared data does not comprise a breaking change.

15. A computer program product for exchanging shared data, the computer program product comprising a computer readable storage medium having program instructions embodied therewith, the program instructions executable by a device to cause the device to:
receive new shared data;
determine whether the new shared data comprises a breaking change, wherein the breaking change comprises a change in format or content of the new shared data such that a consumer application that uses the new shared data cannot operate properly;
in response to a determination that the new shared data does not comprise a breaking change, save the new shared data and set the new shared data as current shared data; and
in response to a determination that the new shared data does comprise a breaking change, save the new shared data and do not set the new shared data as current shared data.

16. The computer program product of claim 15, wherein the program instructions are executable by the device to cause the device to receive the new shared data from a producer of the new shared data via messaging middleware.

17. The computer program product of claim 15, wherein the program instructions are executable by the device to cause the device to receive an event message including the new shared data.

18. The computer program product of claim 15, wherein the program instructions are executable by the device to cause the device to:
receive an event message indicating a change to shared data; and
in response to receiving the event message, retrieve the new shared data.

19. The computer program product of claim 15, wherein the program instructions are executable by the device to cause the device to determine whether the new shared data comprises a breaking change by comparing a new shared data version identifier for the new shared data with a current shared data version identifier for the current shared data.

20. The computer program product of claim 15, wherein the program instructions are executable by the device to cause the device to:
- in response to receiving the new shared data, determine whether there is a current version of the shared data; and
- in response to a determination that there is not a current version of the shared data, determine that the new shared data does not comprise a breaking change.

21. A method for deploying new program code for a consumer of shared data, comprising:
- determining, by a computer system, whether new shared data that is not set as current shared data is available;
- in response to a determination that the new shared data that is not set as current shared data is available, deploying the new program code and setting the new shared data as the current shared data by the computer system; and
- in response to a determination that the new shared data that is not set as current data is not available, stopping deployment of the new program code and providing an error indication by the computer system.

22. The method of claim 21, wherein setting the new shared data as the current shared data is performed after deploying the new program code.

23. The method of claim 21 further comprising:
- retrieving, by the computer system, a latest version of shared data from a producer of shared data;
- determining, by the computer system, whether the latest version of shared data comprises a breaking change from the new shared data; and
- in response to a determination that the latest version of shared data does not comprise a breaking change from the new shared data, saving the latest version of shared data and setting the latest version of shared data as the new version of shared data by the computer system.

24. An apparatus for deploying new program code for a consumer of shared data, comprising:
- a database;
- a set current data version processor configured to:
determine whether new shared data that is not set as current shared data is available in the database,
- provide a success indication in response to a determination that the new shared data that is not set as current shared data is available in the database,
- provide a failure indication in response to a determination that the new shared data that is not set as current data is not available in the database, and
- set the new shared data as the current shared data; and
- a deployment processor configured to:
    - call the set current data version processor to determine whether new shared data that is not set as current shared data is available in the database,
    - deploy the new program code in response to a success indication from the set current data version processor, and
    - stop deployment of the new program code and provide an error indication in response to a failure indication from the set current data version processor.

25. The apparatus of claim 24, wherein the deployment processor is configured to:
- call the set current data version processor a first time before deploying the new program code to determine whether new shared data that is not set as current shared data is available in the database and with a parameter set to disable setting the new shared data as the current shared data; and
- call the set current data version processor a second time after deploying the new program with the parameter set to enable setting the new shared data as the current shared data.

26. The apparatus of claim 24, wherein the set current data version processor is further configured to:
- retrieve a latest version of shared data from a producer of shared data;
- determining whether the latest version of shared data comprises a breaking change from the new shared data; and
- in response to a determination that the latest version of shared data does not comprise a breaking change from the new shared data, save the latest version of shared data in the database and set the latest version of shared data as the new version of shared data.

* * * * *